(12) United States Patent
Cronk

(10) Patent No.: US 6,775,130 B2
(45) Date of Patent: Aug. 10, 2004

(54) PORTABLE COMPUTING DEVICE WITH LEATHER GRAIN

(76) Inventor: Peter J. Cronk, 919 McElwee Rd., Moorestown, NJ (US) 08057

(*) Notice: Subject to any disclaimer, the term of this patent is extended or adjusted under 35 U.S.C. 154(b) by 0 days.

(21) Appl. No.: 10/413,097

(22) Filed: Apr. 14, 2003

(65) Prior Publication Data

US 2003/0206396 A1 Nov. 6, 2003

Related U.S. Application Data

(63) Continuation of application No. 10/002,559, filed on Nov. 1, 2001, now abandoned, which is a continuation of application No. 09/360,678, filed on Jul. 26, 1999, now Pat. No. 6,327,142, which is a continuation-in-part of application No. 29/099,171, filed on Jan. 14, 1999, now Pat. No. Des. 430,155, which is a continuation-in-part of application No. 29/066,939, filed on Feb. 19, 1997, now Pat. No. Des. 407,386.

(51) Int. Cl.[7] .............................................. G06F 1/16
(52) U.S. Cl. ...................... 361/683; 361/759; 381/87; 248/551
(58) Field of Search ................... 361/683, 724–727, 361/87–88, 309, 740, 759; 248/551–553; 312/216, 218

(56) References Cited

U.S. PATENT DOCUMENTS

| | | |
|---|---|---|
| D114,258 S | 4/1939 | Becker et al. |
| D321,866 S | 11/1991 | Newhouse .................. D14/106 |
| D343,167 S | 1/1994 | Mizusugi et al. .......... D14/106 |
| 5,841,630 A | 11/1998 | Seto et al. .................... 361/683 |
| 5,870,282 A | 2/1999 | Andre et al. ................. 361/683 |
| 5,880,928 A | 3/1999 | Ma ............................. 361/683 |
| 5,949,565 A | 9/1999 | Ishida ......................... 359/154 |
| 6,082,683 A | 7/2000 | Yates ....................... 248/118.1 |
| 6,101,086 A | 8/2000 | Kim et al. .................. 361/683 |
| 6,109,434 A * | 8/2000 | Howard, Jr. ................ 206/320 |
| 6,327,142 B1 * | 12/2001 | Cronk ......................... 361/683 |
| 6,421,235 B2 * | 7/2002 | Ditzik ......................... 361/683 |
| 6,426,870 B1 * | 7/2002 | Oross et al. ................. 361/683 |

FOREIGN PATENT DOCUMENTS

| | | |
|---|---|---|
| JP | 06274456 A | 9/1993 |
| JP | 10234448 A | 9/1998 |

OTHER PUBLICATIONS

"Back To The Future At Apple". *Business Week*. May 25, 1998, 1 page.
"Databus, Portable PC Outlook", International Data Corp. Mar. 9, 1998, 1 page.
"Focus—Apple unveils consumer portable computer", Yahoo! Finance. Jul. 21, 1999, pp 1–2.
"A Formula One race car . . .", Dec. 7, 1998, 1 page.
Wildstrom. Stephen. "More Punch in Apple Portables". *Technology & You. Business Week*. Aug. 16, 1999, p.12.
Poletti. Therese. "Apple Computer Sues eMachines Over PC Design", Yahoo! News. Aug. 20, 1999. pp1–2.
Spooner. John. "Big Blue unveiling colorful Thinkpad", Yahoo! News. Oct. 1, 1999. pp 1–2.

\* cited by examiner

*Primary Examiner*—Hung Van Duong
(74) *Attorney, Agent, or Firm*—Duane Morris LLP

(57) ABSTRACT

Portable computing devices, such as notebook and palm top computers are provided which include top and bottom housing portions connected by a hinge. These devices further include a leather grain layer adhered, heat sealed or ultrasonically welded to the housing.

4 Claims, 2 Drawing Sheets

PORTABLE COMPUTING DEVICE WITH LEATHER GRAIN

RELATED APPLICATION DATA

This application is a continuation of U.S. patent application Ser. No. 10/002,559, filed Nov. 1, 2001, now abandoned which is a continuation of U.S. patent application Ser. No. 09/360,678, filed Jul. 26, 1999, now U.S. Pat. No 6,327,142, which is a continuation-in-part of U.S. Design patent application Ser. No. 29/099,171, filed on Jan. 14, 1999, now U.S. Pat. No. D430,155, which in turn, is a continuation-in-part of U.S. Design patent application Ser. No. 29/066,939, filed on Feb. 19, 1997, now U.S. Design Pat. No. D407,386, issued on Mar. 30, 1999, which applications and patent are hereby incorporated by reference in their entirety.

BACKGROUND OF THE INVENTION

Portable personal computer shipments were expected to rise to about 18 million units in 1998. Recent market research has indicated that as the price of portable computing falls, and more and more competitors provide like features, it is getting harder and harder for manufacturers to differentiate their products in the marketplace. Most portable computing devices use a beige or charcoal colored housings. Such colors provide little or no market distinction, which has forced manufacturers to look to translucent bright colors, such as Apple Computer, Inc.'s iMac™ and iBook™, or metallic finishes, such as Packard Bell's Z1™. Such computers have been well received, but they are not very appropriate for business use.

Accordingly, there is a need for a portable computing device having an attractive or unique appearance for distinguishing itself in the marketplace, and providing the look and feel of leather.

SUMMARY OF THE INVENTION

Portable computing devices are provided by this invention which include a housing having top and bottom portions connected by a hinge. The top and bottom housing portions include an inwardly facing surface, an outwardly facing surface and a peripheral edge. A set of keys are disposed on an inwardly facing surface of the bottom portion of the housing, and a display screen is disposed on an inwardly facing surface of the top portion of the housing. The portable computing devices, include the improvement of a leather grain layer adhered, heat sealed or ultrasonically welded to a shell portion of the housing.

The use of synthetic or natural leather on portable computing devices adds a luxurious and expensive looking aesthetic appearance to such devices. The leather grain layer can be disposed on a major portion of the outwardly facing surface of the top portion to provide an eye catching, upscale appearance that is perfect for the business environment. The high friction surface and texture of the leather is also easier for fingers to grip and hold.

BRIEF DESCRIPTION OF THE DRAWINGS

The accompanying drawings illustrate preferred embodiments of the invention as well as other information pertinent to the disclosure, in which.

DETAILED DESCRIPTION OF THE INVENTION

Figure 1:
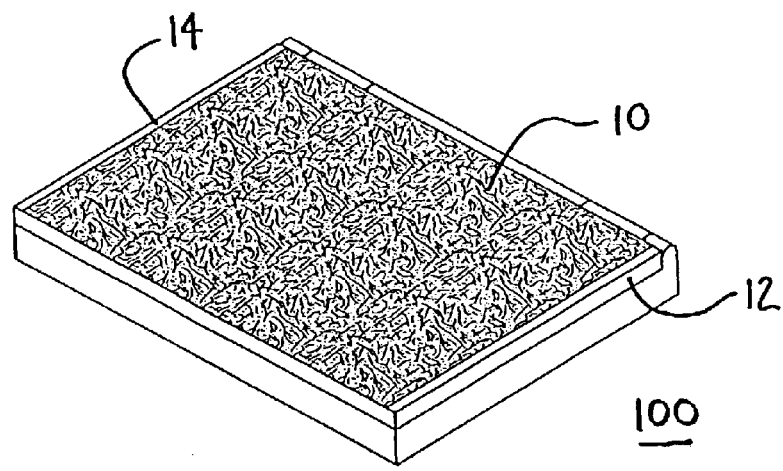
FIG. 1: is a front perspective view of a portable notebook computing device having a leather grain layer.
Figure 2:
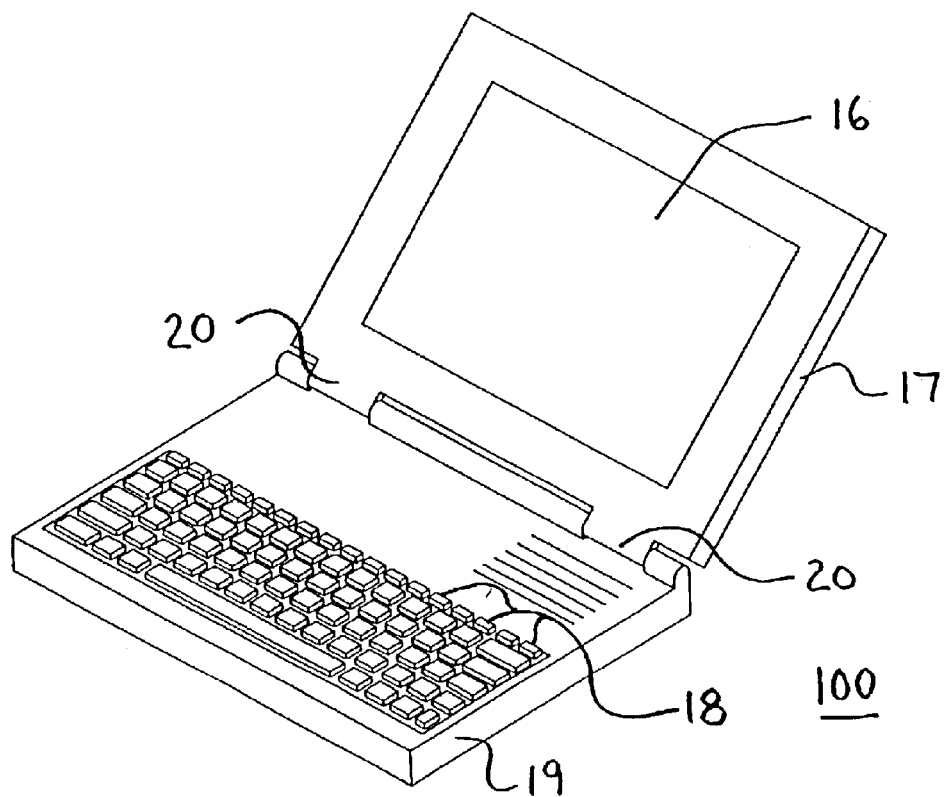
FIG. 2: is the portable notebook computing device of FIG. 1 in an open condition.

With respect to the drawings, and in particular, to the notebook computer 100 shown FIGS. 1 and 2, a description of one preferred embodiment of this invention follows. The notebook computer 100 is of a typical design, including a housing having a top portion 17 and a bottom portion 19 connected by hinge 20. Hinge 20 has at least one hinge element, but is illustrated in FIG. 1 as having two of such elements. The top and bottom portions, also called shells because of the shallow cavities they contain, have inwardly facing surfaces and outwardly facing surfaces, and a peripheral edge. A set of keys 18 is disposed on the inwardly facing surface of the bottom housing portion 19 and a display screen 16 is disposed on an inwardly facing surface of the top housing portion 17. In one embodiment of this invention, a leather grain layer 10 is disposed on the exterior facing surface of the top portion of the housing 17. In the embodiment shown in FIG. 1, a pair of lateral edges 12 and 14 are provided which can be non-ornamental or smooth in appearance. This is optional, since the top can contain a partial or a full leather grain, and the shell can be provided in a variety of shapes and sizes, with curved or square edges and/or corners.

It will be apparent to one of ordinary skill in the art that the leather grain layer 10 of this invention can be a natural leather or a synthetic leather material, such as embossed vinyl. The leather grain ideally exhibits a random grain pattern such as that exhibited by natural leather. It is envisioned that one of ordinary skill in the art will be able to use leather and leather-like materials of known sources, with the ability to bind these materials to the upper housing portion 117 in a conventional manner, such as by adhesive, heat sealing or ultrasonic welding, for example.

Figure 3:
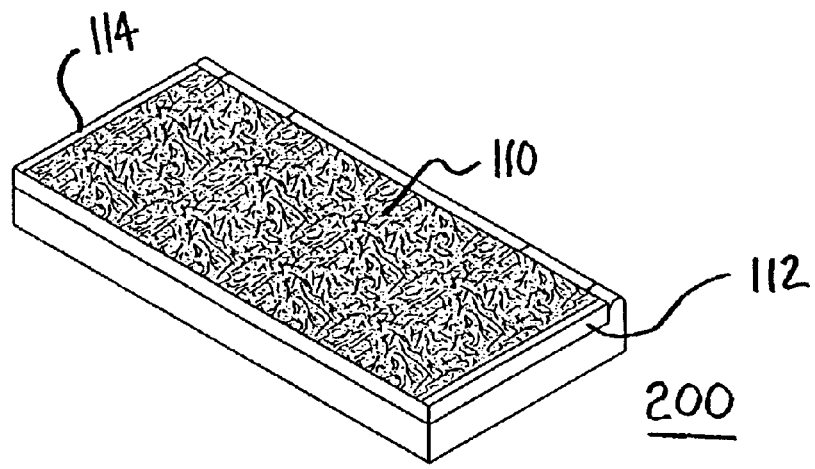
FIG. 3: is a hand-held portable computing device also having a leather grain top layer.
Figure 4:
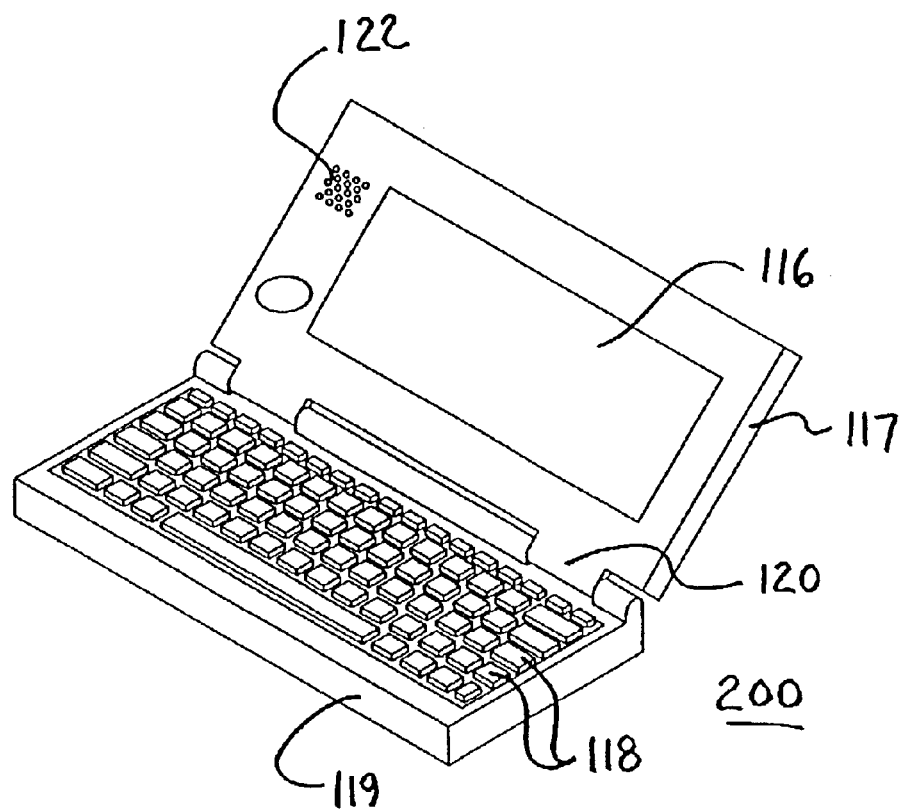
FIG. 4: is the hand-held computing device of FIG. 3 in an open condition.

The portable computing device of this invention may be embodied by a hand-held or "palmtop" computing device 200 as shown in FIGS. 3 and 4. Such devices are known to have a great deal of computing power, but generally have a smaller keyboard 118 and display screen 116 located in the lower housing portion 119 and upper housing portion 117, respectively. Hand-held devices also may include, for example, a series of apertures 122 in the housing for a speaker or microphone, for example.

As with the previous notebook embodiment 100, the hand-held computing device 200 can include a pair of optional smooth lateral edges 112 and 114. Such lateral edges can be helpful in protecting the edge of the leather grain layer from being damaged or delaminated due to heavy use or contact with hard surfaces.

From the foregoing, it can be realized that this invention provides portable computing devices having a leather grain for providing a distinctive appearance, better tactile feel and gripping capability, a more luxurious feel and better marketing distinction. Although various embodiments have been illustrated, this was for the purpose of describing, but not limiting the invention. Various modifications which will become apparent to one skilled in the art, are within the scope of this invention described in the attached claims.

What is claimed:

1. A portable computing device of the type having a keyboard and a display screen, comprising:

a housing having top and bottom shell portions hingedly connected along a rear edge of said shell portions, each of said shell portions having an outwardly facing surface and an inwardly facing surface, said inwardly facing surfaces facing one another when said top and bottom shell portions are swiveled along said hinge into a closed position, said top shell portion, said bottom shell portion, or both, having disposed thereon a leather grain layer which is bonded thereto by adhesive, heat sealing or ultrasonic welding.

2. The portable computing device of claim 1 wherein said leather grain layer comprises natural leather or synthetic leather material bonded directly to said top shell portion.

3. The portable computing device of claim 1 wherein said leather grain layer is disposed on an outwardly facing surface of one of said shell portions.

4. The portable computing device of claim 1 wherein said device is a notebook or palmtop computer.

* * * * *

(12) EX PARTE REEXAMINATION CERTIFICATE (7963rd)
United States Patent
Cronk

(10) Number: US 6,775,130 C1
(45) Certificate Issued: Jan. 4, 2011

(54) PORTABLE COMPUTING DEVICE WITH LEATHER GRAIN

(75) Inventor: Peter J. Cronk, Moorestown, NJ (US)

(73) Assignee: Spanish Leather LLC, Palm Beach Gardens, FL (US)

Reexamination Request:
No. 90/009,605, Oct. 19, 2009

Reexamination Certificate for:
Patent No.: 6,775,130
Issued: Aug. 10, 2004
Appl. No.: 10/413,097
Filed: Apr. 14, 2003

Related U.S. Application Data

(63) Continuation of application No. 10/002,559, filed on Nov. 1, 2001, now abandoned, which is a continuation of application No. 09/360,678, filed on Jul. 26, 1999, now Pat. No. 6,327,142, which is a continuation-in-part of application No. 29/099,171, filed on Jan. 14, 1999, now Pat. No. Des. 430,155, which is a continuation-in-part of application No. 29/066,939, filed on Feb. 19, 1997, now Pat. No. Des. 407,386.

(51) Int. Cl.
*G06F 1/16* (2006.01)

(52) U.S. Cl. .............. 361/679.33; 248/551; 361/679.27; 361/679.56; 361/679.57; 361/759; 381/87

(58) Field of Classification Search .................. None
See application file for complete search history.

(56) References Cited

U.S. PATENT DOCUMENTS

| | | |
|---|---|---|
| 1,613,365 A | 4/1926 | Underwood |
| 2,017,445 A | 3/1935 | Peterson |
| 2,479,854 A | 5/1945 | Miller |
| 2,461,421 A | 12/1945 | Jacobus |
| 2,508,128 A | 7/1946 | Waards |
| 3,847,656 A | 11/1974 | Baumann et al. |
| 3,890,186 A | 6/1975 | Blaschke et al. |
| 4,264,962 A | 4/1981 | Kodaira |
| 4,292,481 A | 9/1981 | Barnes et al. |
| D284,966 S | 8/1986 | Larkins |
| 5,002,184 A | 3/1991 | Lloyd |
| 5,105,338 A | 4/1992 | Held |
| 5,407,517 A | 4/1995 | Hansel et al. |
| 5,413,814 A | 5/1995 | Bowen et al. |
| 2006/0060292 A1 | 3/2006 | Song et al. |
| 2006/0068160 A1 | 3/2006 | Song et al. |
| 2006/0093837 A1 | 5/2006 | Song et al. |

OTHER PUBLICATIONS

Tomei Collection, Kodak No. 1A Folding Pocket 1899–1905, http://ldtomei.googlepages.com/kodakno.1afoldingpocket1899–1905.
The Classic Camera Repair Forum, Voigtlander Virtus Leather Restoration, Feb. 20, 2008–Feb. 25, 2008, http://www.kyphoto.com/classics/forum/messages/3/11626.html?1203967275.
Wikipedia, Ultrasonic welding, Jun. 2, 2010, pp. 1–6.
ABOUT.COM, Composites/Plastics, Heat Sealing, Jun. 2, 2010, 1 pg.

*Primary Examiner*—James Menefee

(57) ABSTRACT

Portable computing devices, such as notebook and palm top computers are provided which include top and bottom housing portions connected by a hinge. These devices further include a leather grain layer adhered, heat sealed or ultrasonically welded to the housing.

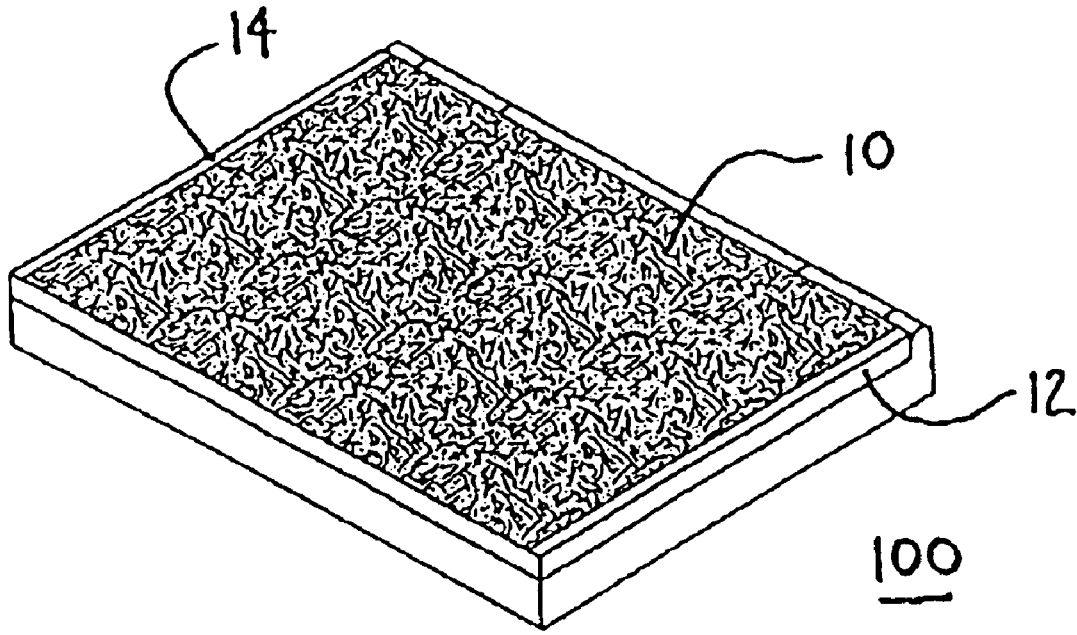

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-4, dependent on an amended claim, are determined to be patentable.

1. A portable computing device of the type having a keyboard and a display screen, comprising:

a housing having top and bottom shell portions hingedly connected along a rear edge of said shell portions, each of said shell portions having an outwardly facing surface and an inwardly facing surface, said inwardly facing surfaces facing one another when said top and bottom shell portions are swiveled along said hinge into a closed position, said top shell portion, said bottom shell portion, or both, having disposed thereon a leather grain layer which is bonded thereto by adhesive, heat sealing or ultrasonic welding *said bonding comprising a polymeric melt bond which at least binds the exposed edge of said leather grain layer to protect the edge of the leather grain layer from being damaged or delaminated due to heavy use or contact with hard surfaces.*

* * * * *